United States Patent

Volz et al.

[11] Patent Number: 5,918,949
[45] Date of Patent: Jul. 6, 1999

[54] BRAKE SYSTEM

[75] Inventors: Peter Volz, Darmstadt; Dalibor Zaviska, Eschborn/Ts.; Paul Linhoff, Eppertshausen, all of Germany

[73] Assignee: ITT Manufacturing Enterprises, Inc., Wilmington, Del.

[21] Appl. No.: 08/894,421

[22] PCT Filed: Feb. 27, 1996

[86] PCT No.: PCT/EP96/00795

§ 371 Date: Oct. 15, 1997

§ 102(e) Date: Oct. 15, 1997

[87] PCT Pub. No.: WO96/28328

PCT Pub. Date: Sep. 19, 1996

[30] Foreign Application Priority Data

Mar. 9, 1995 [DE] Germany ............................ 195 08 331

[51] Int. Cl.⁶ ............................................. B60T 8/42
[52] U.S. Cl. ........................................ 303/115.4; 188/276
[58] Field of Search ........................... 303/115.4; 188/276

[56] References Cited

U.S. PATENT DOCUMENTS

| 4,940,293 | 7/1990 | Burckhardt et al. |
| 5,054,861 | 10/1991 | Resch .................................. 303/116.2 |
| 5,125,724 | 6/1992 | Steiner ................................. 303/115.4 |
| 5,131,730 | 7/1992 | Kollers et al. ....................... 303/113.2 |
| 5,180,216 | 1/1993 | Kirestein ............................. 303/113.2 |
| 5,188,433 | 2/1993 | Reinartz et al. ....................... 303/191 |
| 5,207,485 | 5/1993 | Troster ................................. 303/113.2 |
| 5,261,730 | 11/1993 | Steiner et al. ...................... 303/115.4 |
| 5,486,040 | 1/1996 | Beck et al. .......................... 303/115.4 |

FOREIGN PATENT DOCUMENTS

| 0 460 408 | 12/1991 | European Pat. Off. |
| 39 00 851 | 1/1990 | Germany . |
| 39 29 464 | 3/1990 | Germany . |
| 40 11 329 | 10/1991 | Germany . |
| 41 28 085 | 2/1993 | Germany . |
| 41 32 471 | 4/1993 | Germany . |
| 43 19 161 | 12/1994 | Germany . |
| 93/08053 | 4/1993 | WIPO . |

*Primary Examiner*—Robert J. Oberleitner
*Assistant Examiner*—Robert A. Siconolfi
*Attorney, Agent, or Firm*—Radar, Fishman & Grauer PLLC

[57] ABSTRACT

A brake system including a master cylinder connected to wheel brakes is supplemented by a fluid return system made up of return pumps so that the braking pressure can be adjusted in the wheel brakes. In order to extend this system to a brake system which permits the generation of wheel brake pressure without the application of the brake pedal, the suction side of at least one return pump is connected to the pressure side of a charging pump which aspirates fluid directly from the supply reservoir. To prevent the pressure in the low-pressure range of the system from rising excessively high, the charging pressure of the pump is adjusted so that it only slightly exceeds the precharging pressure of the suction side of the low-pressure accumulator.

3 Claims, 4 Drawing Sheets

BRAKE SYSTEM

BACKGROUND OF THE INVENTION

The present invention relates to a brake system according to the preamble of claim 1.

European patent application No. 0 460 408 discloses a brake system of this type, for example. The charging pump disclosed therein has a very high pilot pressure. Therefore, the publication discloses an additional charging valve which is switched to its open position only if the control valve device is switched to pressure increase.

An additional valve of this type not only renders the system more expensive but also causes additional noises during operation of the system caused by switching of the valve.

Therefore, an object of the present invention is to simplify a system by reducing the number and complexity of the valves to thereby minimize switching noise during operation of the system.

SUMMARY OF THE INVENTION

To this end, the present invention discloses designing the charging pump so that it generates a pilot pressure which is only slightly in excess of the prestress condition of the low-pressure accumulator in the low-pressure range of the brake system.

The advantage is an almost constant operation of the pump in a control phase, i.e. in phases of controlled pressure increase and controlled pressure decrease in the wheel brakes. At most, it may be necessary to provide a safety device which prevents the low-pressure accumulator from being entirely filled by the charging pump.

However, the need for such a device may be obviated when operation of the system is appropriately adapted.

A joint drive of the return pump and charging pump can be provided because the charging pump and the return pump shall be operated together. It has been found that hydrodynamic pumps, for example rotary pumps, are appropriate as charging pumps. The advantage of hydrodynamic pumps is that the pressure at the pump outlet rises if no pressure fluid is removed.

For example, pressure fluid is not discharged when the return pump performs a delivery stroke. The suction valve is closed then, and pressure fluid can develop at the pressure side of the charging pump, with the result that the suction valve is opened early during the suction stroke of the delivery pump. Simultaneously, the starting pressure decline causes increase of the rate of flow of the rotary pump, so that a major charging effect is achieved. Thus, a rotary pump would be optimally adapted to requirements. A corresponding characteristic curve for a reciprocating pump is difficult to achieve.

A further advantage of a rotary pump is that there is no need for an additional pressure relief valve which exactly adjusts the charging pressure.

A pressure relief valve can be provided in case that a hydrostatic pump, e.g., a piston pump, is intended to be used as a charging pump. Advantageously, the opening pressure of the pressure relief valve is temperature-responsive. More particularly, the opening pressure is desired to increase at low temperatures, e.g., at temperatures below –10/C.

The present invention will be explained in detail by way of five Figures.

DETAILED DESCRIPTION OF THE DRAWINGS

Figure 1:
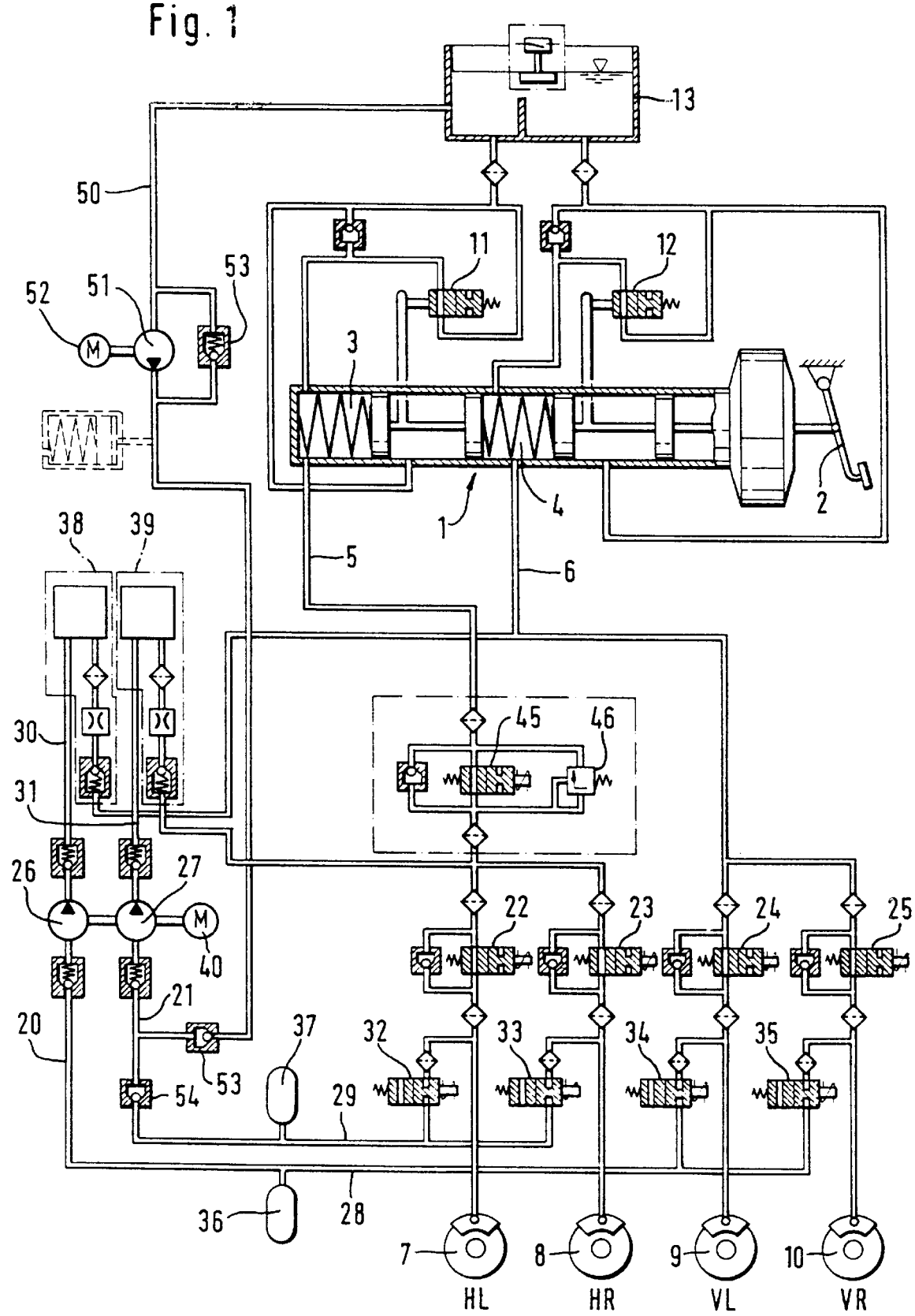
FIGS. 1 to 3 are views of various wiring diagrams.
Figure 2:
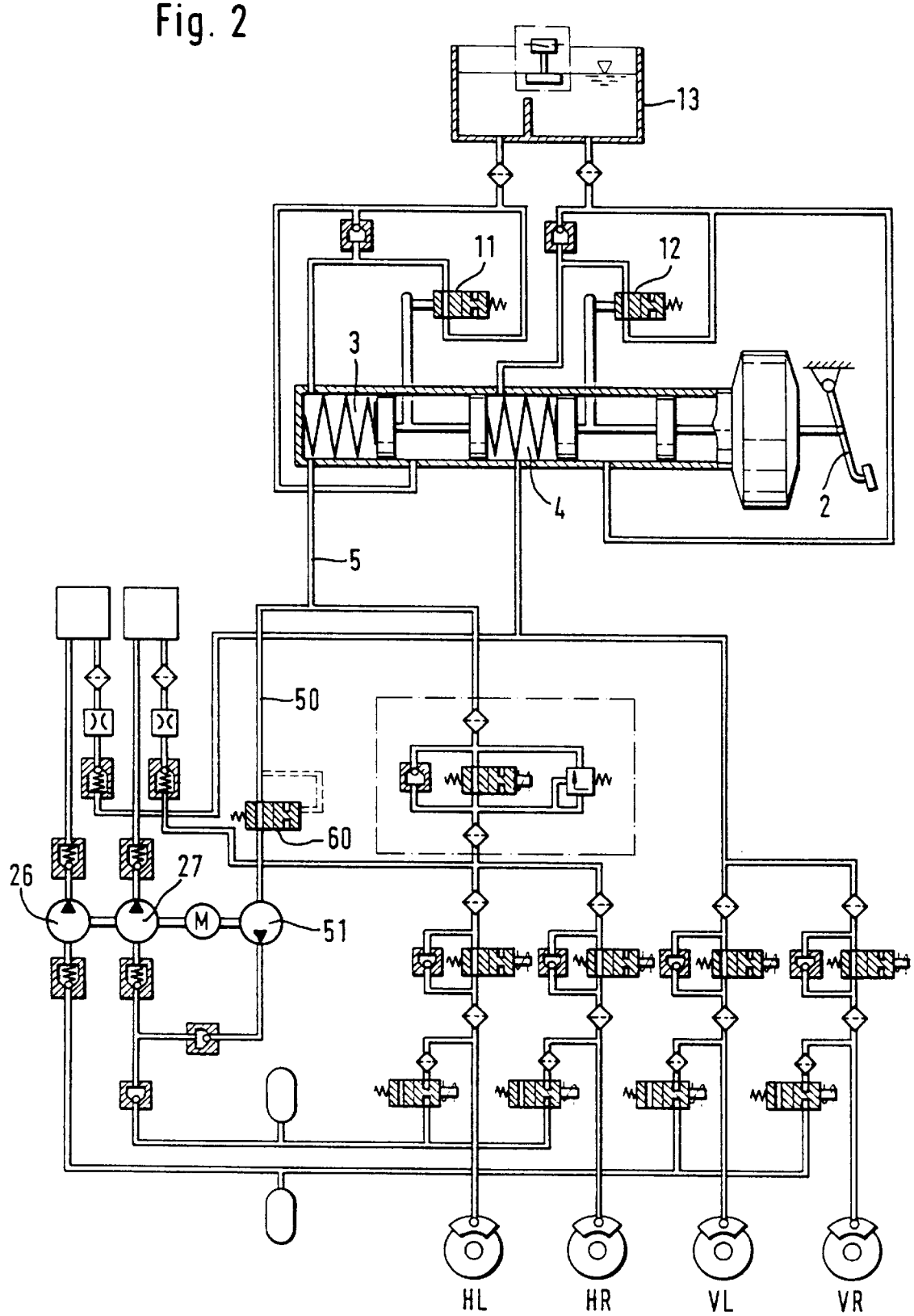
Figure 3:
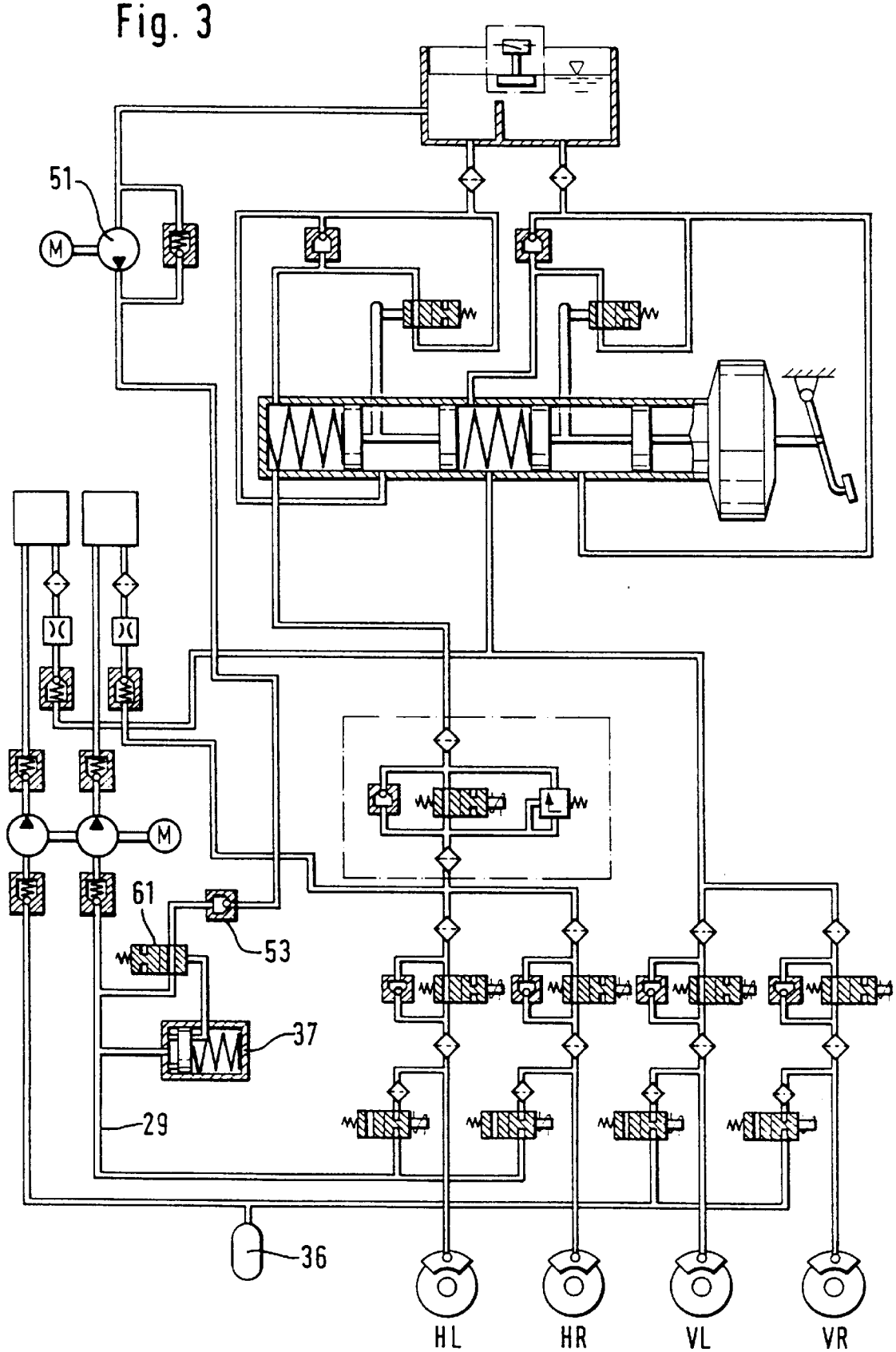

FIGS. 1 to 3 show hydraulic brake systems wherein pressure can be produced in the wheel brakes by pedal application or independently of pedal application.

The basic structure of the brake system includes a master cylinder 1 which is operated by a pedal 2.

Normally, the master cylinder 1 has two working chambers 3, 4 to which wheel brakes 7, 8, 9, 10 are connected by way of brake lines 5, 6. Application of the pedal causes pressure fluid from the working chambers 31 4 to hie conducted to the wheel brakes 7, 8, 9, 10 by way of brake lines 5, 6, with the result that braking pressure may develop.

Further, the working chambers 3, 4 are connected to a supply reservoir 13 by way of central valves 11, 12, and the central valves 11, 12 are open, when the pedal 2 is not applied, so that pressure balance can take place in the brake circuits.

Typically, two wheel brakes are associated with one working chamber to form a brake circuit. In the embodiment shown herein, the wheel brakes of one axle form a brake circuit. This is a so-called black-and-white split-up of brake circuits. Other allotments, for example a diagonal circuit split-up, are also possible.

This basic design can be supplemented by additional hydraulic elements which permit adjusting the pressure in the wheel brakes independently of pedal force. This can be used, for example, to adjust the pressure in the wheel brakes so that the wheels, when slowed down, have an amount of slip which permits the transmission of lateral forces. A system of this type is referred to as antilock system and permits maintaining the steerability of a braked vehicle.

The anti-lock system shown is a system operating according to the recirculating principle. To this end, each brake circuit is allocated to a pump circuit 20, 21 permitting pressure fluid to be removed from the wheel brakes 7, 8, 9, 10 and returned to the working chambers 3, 4 of the master cylinder.

The branched brake lines 5, 6 have inlet valves 22, 23, 24, 25 for this purpose.

The valves are actuated electromagnetically. They are open in their inactive positions and closed in their switch position, i.e. when the exciter coil is energized.

Each pump circuit 20, 21 includes a pump (return pump) 26 or 27 having a respective suction line 28, 29 which is connected to the wheel brakes or the brake lines between the inlet valves and the wheel brakes.

The pressure sides of the pumps 26 and 27 are connected by way of pressure lines 30, 31 to the brake lines 5, 6 between the master cylinder 1 and the inlet valves.

Outlet valves 32, 33, 34, 35 are arranged in the suction lines 28, 29 and are also actuated electromagnetically. However, the valves are closed in their initial positions and are open in their switch positions. Each suction line 28, 29 accommodates a low-pressure accumulator 36 or 37 between the inlet valves and the pumps. Incorporated in the pressure lines 30, 31 are damping elements 38, 39 which each include a high-pressure accumulator, a throttle, a filter, and a return valve.

The anti-lock system includes (not shown herein) wheel speed sensors and an electronic control unit which actuates the inlet and outlet valves and activates and deactivates the motor 40 for the pumps 26, 27. The signals furnished by the wheel speed sensors are used to determine whether it is necessary to decrease the pressure in one or more of the wheel brakes in order to prevent locking of the associated wheel. The associated inlet valve is closed and the associated outlet valve is opened for pressure decrease in a wheel brake. This causes pressure fluid from the wheel brake to initially flow into the low-pressure accumulator 36 or 37, to be then taken up in the pump 26 or 27 and to be returned to the associated working chamber 3 or 4.

The outlet valve is opened in short pulses until the desired pressure decrease has been achieved. For pressure re-increase, the outlet valve is closed and the inlet valve is pulsewise opened.

The inlet valve and the outlet valve are closed for maintaining the pressure constant.

Typically, the pumps 26, 27 are piston pumps of the self-priming or non-self-priming type. The low-pressure accumulators 36, 37 generally have a low absorption volume which is conformed to the delivery rate of the pumps 26, 27. The accumulators can take up the quantity of pressure fluid which is required to perform a rapid pressure decrease in the respective wheel brake.

This system may be extended, e.g. to a system which is capable of developing pressure in the wheel brakes even when the pedal is not applied. This may become necessary e.g. in so-called traction slip control systems (TCS), where the objective is to prevent the driven wheels from spinning in the presence of low coefficients of friction between road surfaces and tires and excessive drive torques.

Another range of application relates to so-called driving stability control systems (DSC) where the objective is to produce a torque around the vertical axis of the vehicle by controlled braking pressure development on individual wheels, in order to compensate oversteering or understeering of the vehicle during cornering.

Rapid pressure increase is necessary to ensure operation of these control systems. This is critical because initially the clearance of the brakes must be overcome for an effective pressure build-up. This means, in order that braking pressure build-up may occur at all, a considerable quantity of pressure fluid must first be supplied in order to overcome the clearance of the brakes.

Return pumps are not configured to satisfy this requirement so that so-called charging pumps are used. A charging line 50 connects the suction side of the pump 27 with the supply reservoir 13. A charging pump 51 is inserted in the charging line. The charging pump may be a piston pump, or a rotary pump which has the advantage of very low noise operation. The charging pump delivers pressure fluid from the supply reservoir 13 to the suction side of the pump 27.

Also, a separating valve 45 having a parallel connected pressure relief valve 46 is used. The separating valve 45 prevents pressure fluid from discharging from the pumps to the supply reservoir 13.

In the mentioned embodiment, only one charging device is provided for a brake circuit, i.e. for the brake circuit to which the wheel brakes of the driven wheels are connected.

When the system shall be able to produce a pilot pressure for each wheel brake, a charging device is required also for the other pump. A separate drive motor 52 is provided for the charging pump 51 in the embodiment of FIG. 1.

However, as is shown in the embodiment of FIG. 2, a joint drive 40 can be provided for the pumps 26 and 27 and for the charging pump 51.

The charging line 50 ends into the suction side of the pump 27 by way of a non-return valve 53. The purpose of the non-return valve 53 is to prevent pressure fluid, which propagates through the suction line 29 to the suction side of the pump 27, from discharging into the supply reservoir 13 by way of the charging line 50.

A non-return valve 54 is also arranged in the suction line 29. The purpose of the non-return valve 54 is to prevent pressure fluid which is supplied from the charging pump 51 to the suction side of the pump 27 from moving into the low-pressure accumulator 37. In the absence of such a valve, the charging pump 51 could fill the low-pressure accumulator 37 so that a rapid pressure reduction in the wheel brake, as explained above, would not be possible.

The charging pump 51 is rated so, or provided with a pressure relief valve 55, that a charging pressure prevails at its outlet which is slightly in excess of the filling pressure (i.e. the preload) of the low-pressure accumulator 37. Because the filling pressure of the low-pressure accumulator 37 amounts to 2 bar approximately, a charging pressure of approximately 3 bar is appropriate.

When the charging pump 51 is configured as a piston pump, the charging pressure can be adjusted by a pressure relief valve 55.

When a rotary pump is employed as charging pump 51, the charging pressure can be determined by the dimensioning of the rotary pump 51.

The advantage of a low charging pressure of this type, compared to the conventional pressure of 8 to 10 bar, is that the charging pump 51 can operate without interruption during slip control operations.

The pressure on the suction side 27 is not permitted to exceed the charging pressure of the charging pump, i.e. 3 bar, for example. This also defines the bottom limit for the wheel braking pressure.

Although brake forces are still transmitted when the wheel braking pressure amounts to 3 bar, for example, they are very low so that they can be considered as zero for control purposes. Matters are different with charging pressures in the magnitude of 8 to 10 bar. The related bottom limit value for the wheel braking pressures is not acceptable so that additional provisions must be made with such charging pressures in order to separate the charging pump 51 from the suction side of the pump when pressure reduction in the wheel brake is desired. Thus, selecting the charging pressure to be roughly 3 bar obviates the need for additional means.

The embodiment of FIG. 2 corresponds roughly to the embodiment of FIG. 1, with the difference that the suction line 50 of the charging pump 51 is not connected directly to the supply reservoir 13 but to one of the working chambers 3, 4. In this case, the charging pump 51 is connected only indirectly to the supply reservoir 13, i.e. by way of the working chambers 3, 4 and the central valves 11, 12 which are open when pedal 2 is not applied.

A separate connection to the supply reservoir 13 is not required in this design. The connection to the brake circuit can easily be made because normally the valves and the pumps are arranged in a joint block.

However, a shut-off valve 60 must be provided in this arrangement either in the suction range or in the pressure range of the charging line 50.

The shut-off valve 60 is positioned in the suction range of the line 50 in FIG. 2.

The valve is actuated hydraulically and is open in its initial position. The control line of the valve (shown in dotted lines) can be loaded by the pressure in the brake line 5.

This means that when the brake pedal is actuated, the pressure developing in the brake line 5 will change the shut-off valve 60 over and separate the suction side of the charging pump 51 from the brake line. In this case, the brake line pressure cannot propagate until the suction side of the pump 27. This ensures that the pressure in the wheel brakes can be reduced during slip control.

Another variation is shown in FIG. 3 which shall prevent the low-pressure accumulator 37 from being filled by the charging pump 51. To this end, the shut-off valve 61 is provided in the pressure range of the charging line so and actuated mechanically by the piston of the low-pressure accumulator 37. A possible embodiment of a valve of this type will be described in detail hereinbelow with respect to FIG. 5. The purpose of the embodiment is that the charging pump 51 is separated from the suction line 29 at a defined rate of filling of the low-pressure accumulator 37. This arrangement may be provided for the case that the charging pump 51, as illustrated, aspirates fluid directly from the supply reservoir 13. The arrangement may also be provided when the aspiration of fluid is effected by way of the master cylinder 1, as has been explained in FIG. 2.

The operation of the illustrated systems is so that in case pressure shall be built up in the wheel brakes without application of the pedal 2, the electronic control unit sends switch-on signals to the drive of the pumps 26, 27 and the drive of the charging pump 51. Further, the separating valve 45 which is arranged in the brake line 5 between the inlet valve 22 and the working chamber 3 is switched to its closed position.

The pressure line 31 ends into the brake line 5 between the outlet valve 22 and the separating valve 45. The closed separating valve 45 prevents the pressure fluid supplied by the pump 27 from being conducted to the supply reservoir by way of the master cylinder 1. Instead, the pressure fluid is conducted to the wheel brakes 7 and 8 by way of the open inlet: valve 22, 23. A pressure relief valve 46 in parallel to the separating valve defines the top limit for the pump pressure. As soon as a quantity of wheel braking pressure is reached which is predetermined by the prevailing control (TCS, DSC), precise control can be performed by pressure reduction, pressure maintaining and pressure re-increase. This is done by opening or closing the inlet or outlet valves exactly as in ABS control operations. It must be pointed out once more that choosing the charging pressure to be 3 bar roughly permits continuous operation of the charging pump 51 during traction slip or driving stability control operations when a sufficient charging capacity is provided. This reduces the expenditure in structural arrangements and assists in minimizing noises. It would also be possible to decrease the charging pressure below the filling pressure of the low-pressure accumulator. This would even obviate the need for the non-return valve 54 because the charging pressure of the charging pump 51 would not permit filling the low-pressure accumulator 37. It is likely that the charging pressure is not sufficient to appropriately fill the pump 27 and to achieve a rapid pressure build-up.

The following should be noted with respect to the arrangement of the shut-off valve 60. As explained, the shut-off valve 60 can be arranged in the suction range or in the pressure range of the charging line 50. When the valve is arranged in the pressure range of the charging line 50, the change-over pressure must be in excess of the charging pressure of the charging pump 51. However, the advantage of the arrangement would be that the throttling resistance of the shut-off valve 60 can be compensated by a slightly increased charging pressure of the pump 51 in the pressure range of the charging line 50.

The advantage of arranging valve 60 in the suction range of the charging line 50, as illustrated in FIG. 2, results in that the change-over pressure can be kept low so that the pressure generated by application of the pedal 2 can be prevented from propagating into the suction line in any case.

It should be noted with respect to the shut-off valve 61 that the actuation can be performed not only mechanically but also electromechanically. It would be necessary in the latter case to sense the rate of filling of the low-pressure accumulator by a sensor. It would also be possible to identify the rotational speed of the pumps 27. This would provide indications as to the rate of filling of the low-pressure accumulator.

Figure 4:
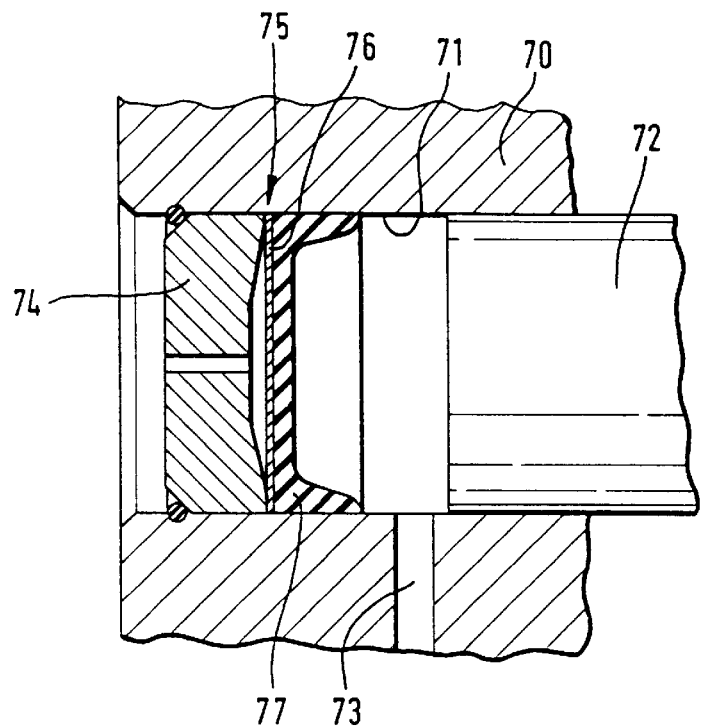
FIG. 4 is a view of a pressure accumulator connected downstream of a charging pump.

FIG. 4 includes a pressure accumulator for a charging pump 51 which is configured as a reciprocating pump. The housing 70 of the pump 51 is shown which includes a bore 71 in which a piston 72 of the charging pump is moved to and fro.

A port 73 leads to the suction side of the pump 27. To achieve a slight increase in the charging pressure when the rate of delivery is low, a flexible diaphragm 75 is provided at the bottom of bore 71 which is closed by a plug 74. Diaphragm 75 includes a resilient plate 76 on which a b owl-shaped rubber sleeve 77 abuts. Plug 74 has a conical design in relation to the elastic plate 76.

The operation is as follows. When the fluid discharge from the charging pump 51 is interrupted, for example, because the pump 27 performs a delivery stroke, the elastic plate 76 will slightly be deflected, whereby an additional volume is caused. Additionally, the tension in the resilient plate 76 will be increased so that the charging pressure rises slightly. The result is that during the suction stroke of the pump 27 an increased charging volume is available which is subjected to a charging pressure that is increased to some extent for a brief interval.

Figure 5:
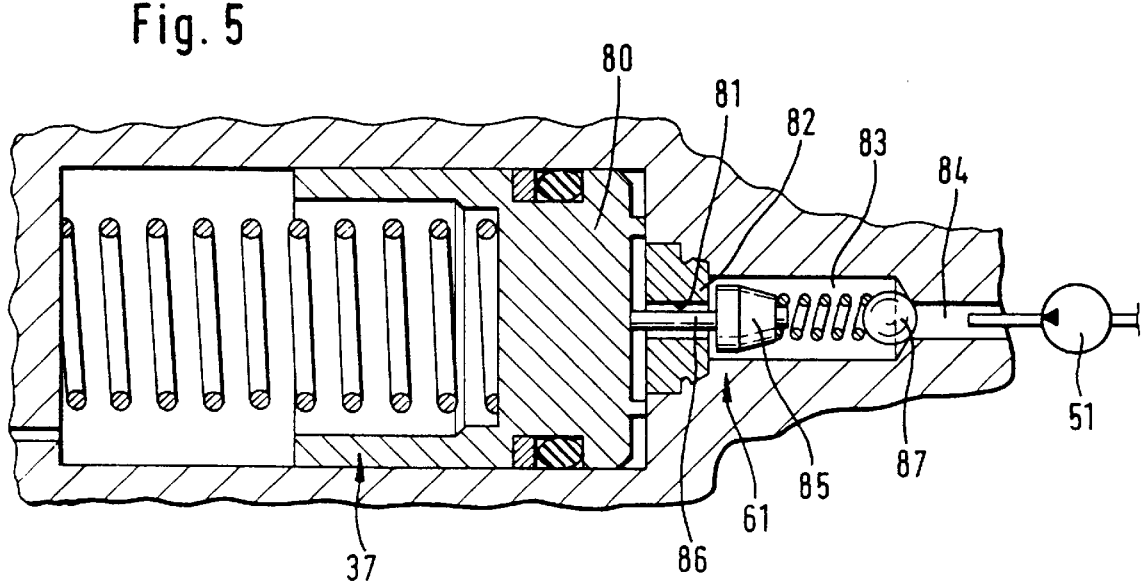
FIG. 5 is a cross-sectional view of a valve controlled by a low-pressure accumulator.

FIG. 5 shows the shut-off valve 61 and a low-pressure accumulator 37. The low-pressure accumulator 37 includes a piston 80 which is guided in a bore. The bottom of the bore 80 includes a passage 81 which is configured as valve seat 82. The passage 81 leads into a chamber 83 which is connected to the suction side of the charging pump 51 by way of a port 84. In the transition from the port 84 to the chamber 83, a valve closure member 87 is provided which forms the non-return valve 53 (see FIG. 1).

Further, chamber 84 houses a valve member 85 having a tappet 86 which projects through the bore 81 and abuts the piston 80 of the low-pressure accumulator 37.

When the piston 80 is placed on the bottom of the bore, the valve member 85 is maintained at a distance from valve seat 82. Thus, the shut-off valve 61 is opened. When the low-pressure accumulator is filled, the piston 80 will move away from the bottom of the bore so that the tappet 86 is not supported any more and the valve member 85 can move to bear against the valve seat 82. The shut-off valve 61 is closed.

We claim:

1. A pedal-operated hydraulic brake system which is capable of delivering pressure fluid into the wheel brakes without application of the pedal, including a master cylinder with at least one working chamber to which wheel brakes are connected, a pump circuit in which a return pump with a suction side and a pressure side is incorporated which with its pressure side returns pressure fluid discharged from the wheel brakes into the working chamber of the master cylinder, and valves which, when actuated, permit the pressure in the wheel brakes to be adjusted irrespective of the pressure in the master cylinder, a charging pump generating a charging pressure and having a suction line which is connected to a supply reservoir and a pressure line which is connected to the suction side of the return pump, a prestressed low-pressure accumulator on the suction side of the return pump which provides for intermediate storage of the pressure fluid discharged from the wheel brakes, wherein the charging pressure of the charging pump exceeds the prestress of the low-pressure accumulator only to a slight extent, and wherein the charging pump is in continuous operation in phases where pressure increase in the wheel brake is desired irrespective of pedal application, and pressure fluid delivery is interrupted only when the low-pressure accumulator is filled wherein the charting pump is a piston pump including a pressure relief valve wherein the pressure relief valve is operated temperature-responsively wherein the opening pressure of the pressure relief valve is increased at temperatures below −10° C.

2. The brake system as claimed in claim 1, wherein the charging pressure of the charging pump amounts to 3 bar approximately.

3. The brake system as claimed in claim 1, wherein the return pumps and the charging pump have one joint drive.

\* \* \* \* \*